United States Patent
Lay et al.

(10) Patent No.: US 8,316,899 B2
(45) Date of Patent: Nov. 27, 2012

(54) FILL POCKET HOUSING FRESH AIR FILTER ASSEMBLY

(75) Inventors: Karen E. Lay, Madison Heights, MI (US); William F. Lietzau, III, Lansing, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 374 days.

(21) Appl. No.: 12/815,982

(22) Filed: Jun. 15, 2010

(65) Prior Publication Data

US 2011/0303690 A1  Dec. 15, 2011

(51) Int. Cl.
  *B65B 1/04* (2006.01)
  *B60K 15/035* (2006.01)
(52) U.S. Cl. .................. 141/286; 141/285; 220/746
(58) Field of Classification Search .............. 141/59, 141/285, 286, 350; 220/86.2, 745, 746
See application file for complete search history.

(56) References Cited

U.S. PATENT DOCUMENTS

| 4,741,369 | A | * | 5/1988 | Dawson | 141/286 |
| 5,701,928 | A | * | 12/1997 | Aoki | 137/312 |
| 5,740,842 | A | * | 4/1998 | Maier et al. | 141/45 |
| 6,029,719 | A | * | 2/2000 | Hor et al. | 141/348 |
| 6,230,739 | B1 | * | 5/2001 | Gericke | 137/588 |
| 6,260,587 | B1 | * | 7/2001 | Smith, Jr. | 141/59 |
| 7,614,431 | B2 | * | 11/2009 | Basista et al. | 141/286 |
| 2011/0120591 | A1 | * | 5/2011 | Erdmann et al. | 141/59 |

* cited by examiner

*Primary Examiner* — Timothy L Maust

(57) ABSTRACT

A fuel venting system for use with a fuel system of a vehicle. The system includes a fill pocket housing including an upper back wall having vent openings allowing fluid flow therethrough. A vent shield extends proximate to the vent openings on a back side of the upper back wall and extends outward away from the upper back wall as the back wall extends downward, with the vent shield also having side walls extending from the back wall to define a bottom opening. A diverter has side walls mounted to the upper back wall and a back wall extending between the side walls to surround the vent shield to form a gap between the diverter walls and the vent shield to receive a filter therein.

13 Claims, 3 Drawing Sheets

FILL POCKET HOUSING FRESH AIR FILTER ASSEMBLY

BACKGROUND OF INVENTION

The present invention relates generally to fuel filling systems on vehicles and more particularly to venting of the fuel filling systems.

Fuel systems on vehicles generally require venting. In some automotive vehicles, the fuel tank is vented to the front of the vehicle near the engine compartment even though the fuel tank is near the rear of the vehicle. The venting may be, for example, connected to a transmission vent line. This type of venting arrangement requires a relatively long length of fresh air line and multiple clips to support the flexible line. This arrangement has the potential to end up with a pinched or crimped line.

In order to avoid these problems, others have attempted to vent the fuel system via a fill pocket area. A first configuration vents inside the fuel pocket by employing a double walled fill pipe. The vent is located under the lip of the fill pipe, with the fill pocket being tightly sealed against dust and debris. However, the cost of a double walled pipe is more than is desirable, and the cost and complexity in sealing the fill pocket area is undesirable. A second configuration has an open vent located near the top of the fill pocket housing. However, this open vent allows debris to fall into the fill pipe during fueling, which allows the debris to get into the fuel system.

SUMMARY OF INVENTION

An embodiment contemplates a fuel venting system for use with a fuel system of a vehicle comprising a fill pocket housing, a vent shield and a diverter. The fill pocket housing includes a base portion configured to mount around an opening in a fuel fill pipe and an upper back wall extending upward from the base portion, with the upper back wall having vent openings allowing fluid flow therethrough. The vent shield extends proximate to the vent openings on a back side of the upper back wall, with the vent shield having a back wall with a top edge abutting the upper back wall and extending outward away from the upper back wall as the back wall extends downward; the vent shield also having side walls extending from the back wall toward the upper back wall to define a bottom opening. The diverter has side walls mounted to the upper back wall and a back wall extending between the side walls, the diverter extending around the vent shield to form a gap between the diverter walls and the vent shield to receive a filter therein, with the back and side walls of the diverter defining a lower opening of the diverter.

An advantage of an embodiment is that the fuel system can vent to atmosphere, at minimal cost, while protecting against debris entering the fuel system. This is achieved while maximizing the ability of the filter to self-clean. A vent shield deflects dirt, water and debris out behind the fill pocket housing away from the fill pipe. Also, a diverter has a lower opening that angles toward the front of the vehicle to protect against mud and snow being thrown up by the adjacent vehicle tire when the vehicle backs up. Moreover, the fill pocket does not need to be tightly sealed against the elements in order to reduce the chance of debris entering the fuel system.

In addition, quick fresh air filter servicing can be achieved if a filter door is employed with the fresh air filter assembly since the filter will be easily accessible through the door.

The fresh air filter assembly also allows for a relatively short fresh air line, which reduces the flow restrictions and minimizes the routing of the line and chances for kinks in the line to develop. Moreover, the fresh air filter assembly allows for venting from multiple locations, which also reduces restrictions as well as minimizing the chance for a clogged and restricted air filter.

DETAILED DESCRIPTION

Figure 1:
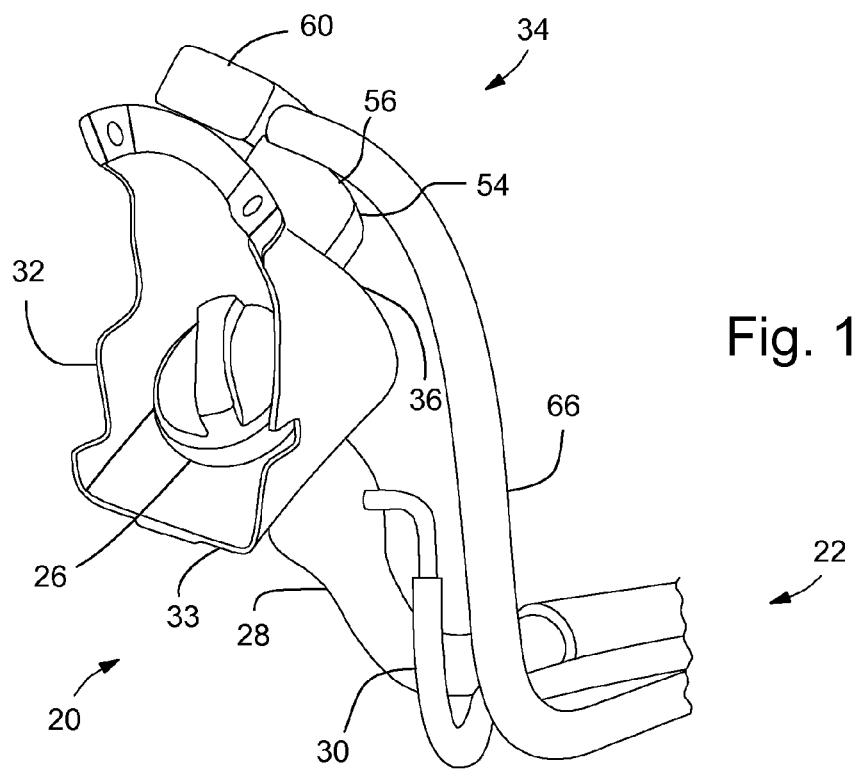
FIG. 1 is a perspective view of a portion of a fuel system for a vehicle.
Figure 2:
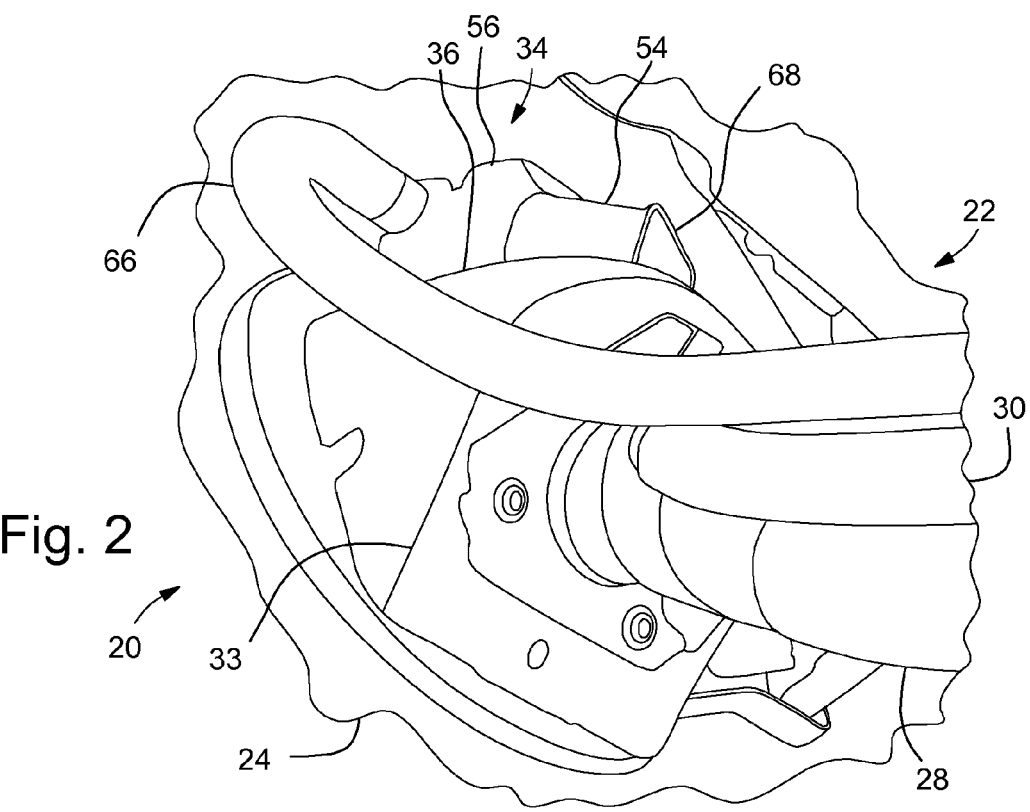
FIG. 2 is a perspective view of a portion of the fuel system mounted to a vehicle body.
Figure 3:
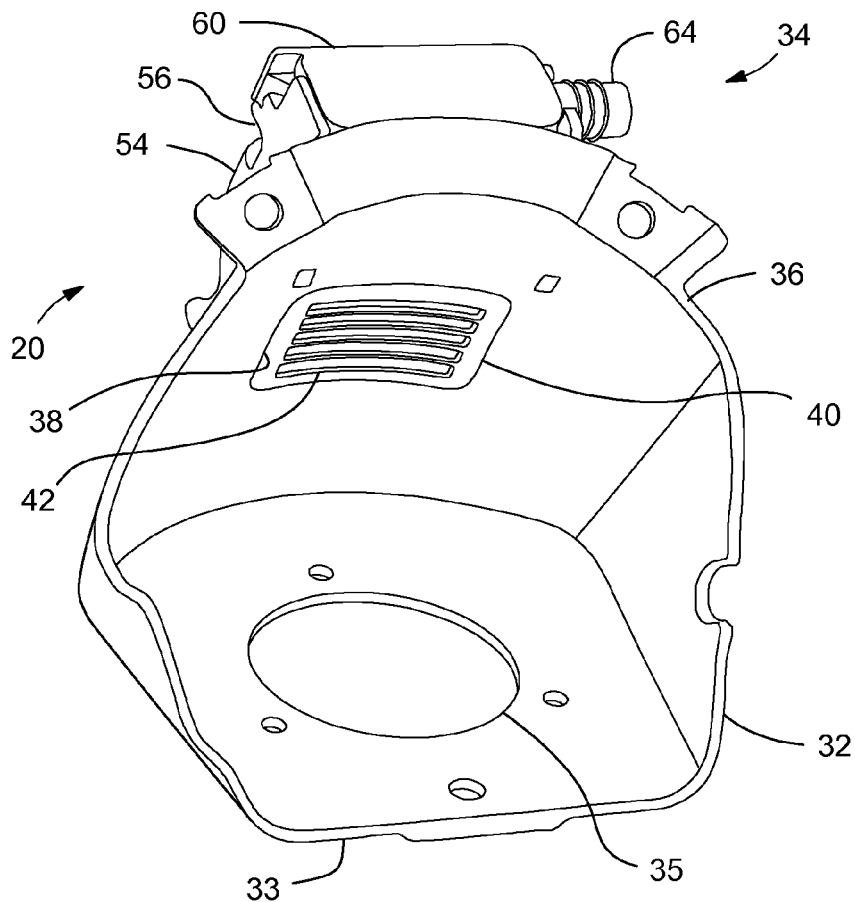
FIG. 3 is a perspective view of a fresh air filter assembly mounted on a fill pocket housing.
Figure 4:
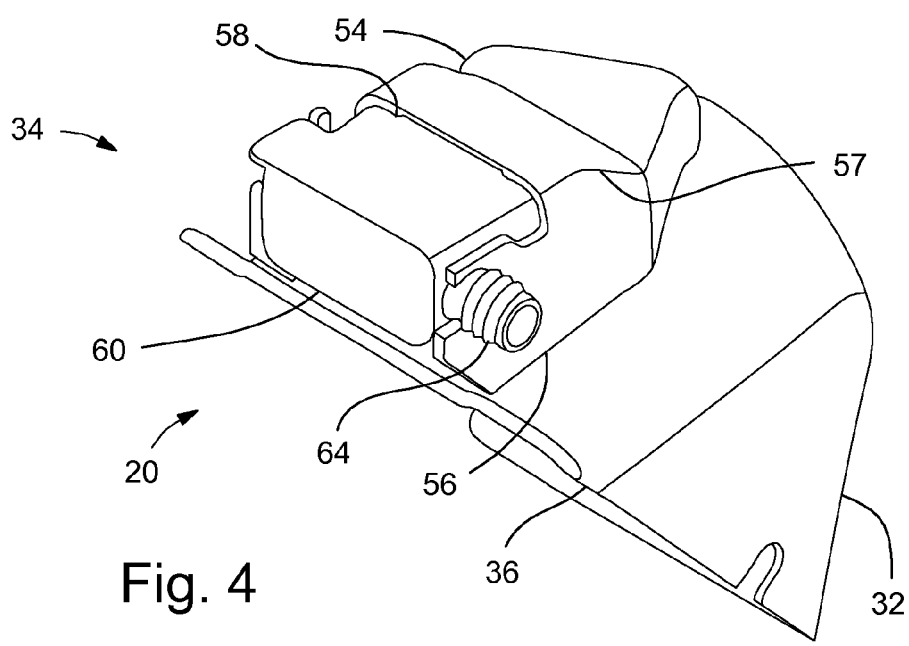
FIG. 4 is another perspective view of the fresh air filter assembly mouthed on the fill pocket housing.
Figure 5:
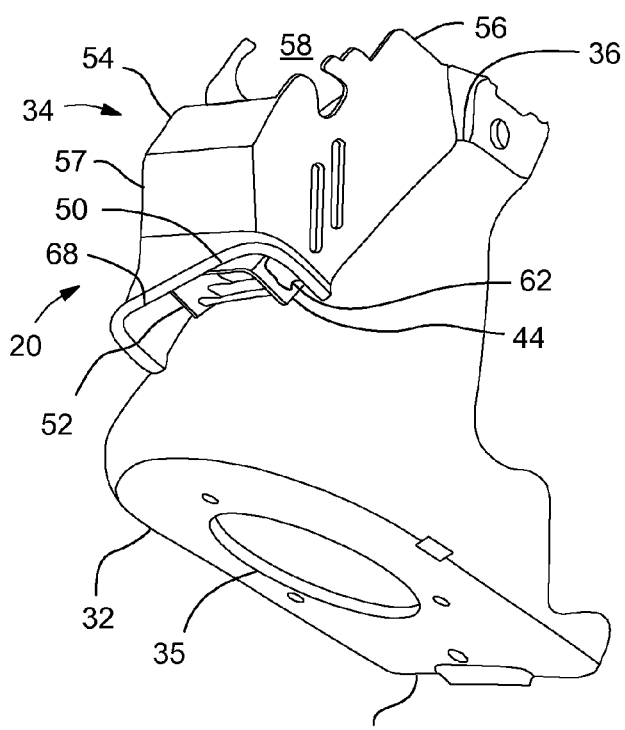
FIG. 5 is a perspective view of a portion of the fresh air filter assembly (without a filter housing and filter shown) mounted on the fill pocket housing.
Figure 6:
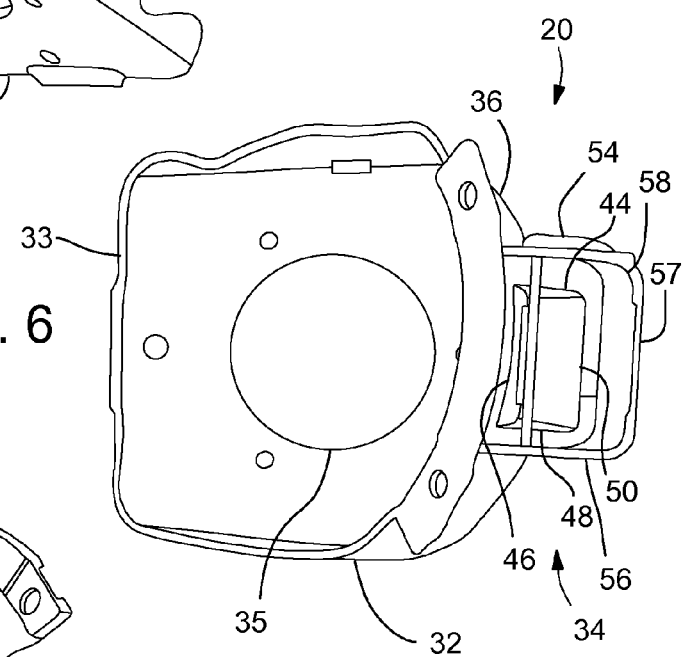
FIG. 6 is another perspective view of the portion of the fresh air filter assembly of FIG. 5 mounted on the Fill pocket housing.
Figure 7:
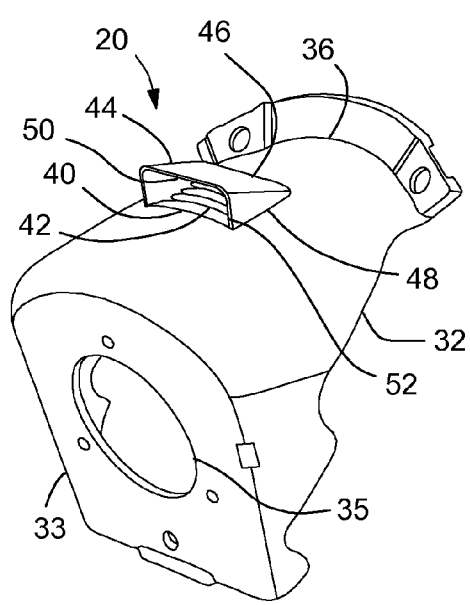
FIG. 7 is a perspective view of a vent shield mounted on the fill pocket housing.

FIGS. 1-7 show different views of a fuel venting system 20 used with a fuel system 22 mounted to a vehicle body 24. The fuel system 22 includes a fuel cap 26 mounted to an opening in a fill pipe 28 that leads to a fuel tank (not shown). A tank vent line 30 may connect to the fill pipe 28 near the opening and also extend down to the fuel tank. A fill pocket housing 32 includes a base portion 33 that includes a fill pipe hole 35. The fill pipe 28 extends through the hole 35, with the base portion 33 mounted near the opening in the fill pipe 28 adjacent to the fuel cap 26. The fill pocket housing 32 attaches to the vehicle body 24 around an opening in the vehicle body to define an accessible access area for fueling the vehicle. Typically a fuel fill door (not shown), is hinged on the vehicle body and covers the fill pocket area when the vehicle is not being fueled.

The fuel venting system 20 includes a fresh air filter assembly 34 that mounts on an upper back wall 36 of the fill pocket housing 32. The upper back wall 36 extends upward from the base portion 33 and has a door opening 38. A filter door 40 is mounted in this opening 38 and includes vent openings 42 that allow air to flow to the fresh air filter assembly 34. The filter door 40 is preferably removably mounted to the upper back wall 36, so that it can be removed if changing of a filter is required. Filter replacement may be required for some vehicles that operate in very dusty environments. This allows for accessing of the filter via the front of the fill pocket housing 32. The filter door 40 may be held in place with flexible snap features or by other means in order to allow for ease of removal while still securely retaining the door 40 during vehicle operation. Alternatively, the upper back wall 36 has the vent openings directly therein, without a filter door. However, while less costly, the filter door 40 has the advantage over the vent openings being directly in the upper back wall 36 by allowing for easier access to the filter material.

Behind the vent openings 42 is a vent shield 44 that is secured along its top edge 46 and side walls 48 to the filter door 40. A back wall 50 of the vent shield 44 angles outward away from the upper back wall 36 as it extends downward away from the top edge 46 so that there is a bottom opening 52 of the vent shield 44 that allows fluid communication between the vent openings 42 and the rest of the fresh air filter assembly 34 only through this bottom opening 52. This vent shield 44, then, allows for air flow while protecting the fill pocket (in the front of the fill pocket housing 32) from debris backflow from the filter into the pocket by routing dirt and water out behind the fill pocket (on the backside of the upper back wall 36). The vent shield 44 also protects from water splashes inside the fill pocket splashing water through the vent openings 42 into a fresh air line.

The fresh air filter assembly 34 also includes a diverter 54 that has side walls 56 secured to the upper back wall 36 of the fill pocket housing 32 and a back wall 57 extending between the two side walls 56. The diverter 54 has an upper opening 58 for receiving and supporting a filter housing 60. The filter housing includes a filter 62 (partially shown in FIG. 5) that surrounds the back side of the vent shield 44 and a fresh air line connector 64 that connects to a fresh air line 66, which extends from a canister vent solenoid (not shown). The diverter 54 also has a lower opening 68 that may be angled, with one side wall 56 extending downward farther than the other one. This allows for the lower opening 68 to be relatively large while still blocking debris that may be thrown up toward the fresh air filter assembly 34. For example, the lower opening 68 may be angled toward the front of the vehicle to protect against mud and snow being thrown up by the adjacent vehicle tire (not shown) when the vehicle backs up.

Moreover, the lower opening 68 allows for debris that accumulates in the filter 62 to fall out on the back side of the upper back wall 36, which helps the filter to self-clean and also allows for additional air flow in addition to the air flow that occurs through the vent openings 42.

While certain embodiments of the present invention have been described in detail, those familiar with the art to which this invention relates will recognize various alternative designs and embodiments for practicing the invention as defined by the following claims.

What is claimed is:

1. A fuel venting system for use with a fuel system of a vehicle comprising:
   a fill pocket housing including a base portion configured to mount around an opening in a fuel fill pipe and an upper back wall extending upward from the base portion, with the upper back wall having vent openings allowing fluid flow therethrough;
   a vent shield extending proximate to the vent openings on a back side of the upper back wall, the vent shield having a back wall with a top edge abutting the upper back wall and extending outward away from the upper back wall as the back wall extends downward, the vent shield also having side walls extending from the back wall toward the upper back wall to define a bottom opening; and
   a diverter having side walls mounted to the upper back wall and a back wall extending between the side walls, the diverter extending around the vent shield to form a gap between the diverter walls and the vent shield to receive a filter therein, the back and side walls of the diverter defining a lower opening of the diverter.

2. The fuel venting system of claim 1 wherein the back and side walls of the diverter define an upper opening and the fuel venting system includes a filter housing mounted in the upper opening and the filter is mounted in the filter housing and extends between the diverter and the vent shield.

3. The fuel venting system of claim 2 wherein the upper back wall includes a door opening and a filter door removably mounted in the door opening, with the filter door including the vent openings, and wherein the vent shield is mounted to the filter door and removable therewith.

4. The fuel venting system of claim 2 wherein one of the side walls of the diverter extends downward farther than another wall of the diverter such that the lower opening is oriented facing forward on the vehicle.

5. The fuel venting system of claim 2 wherein the filter housing includes a fresh air line connector configured to mount to a fresh air line extending form a canister vent solenoid.

6. The fuel venting system of claim 1 wherein the upper back wall includes a door opening and a filter door removably mounted in the door opening, with the filter door including the vent openings, and wherein the vent shield is mounted to the filter door and removable therewith.

7. The fuel venting system of claim 6 wherein one of the side walls of the diverter extends downward farther than another wall of the diverter such that the lower opening is oriented facing forward on the vehicle.

8. The fuel venting system of claim 1 wherein one of the side walls of the diverter extends downward farther than another wall of the diverter such that the lower opening is oriented facing forward on the vehicle.

9. A fuel venting system for use with a fuel system of a vehicle comprising:
   a fill pocket housing including a base portion configured to mount around an opening in a fuel fill pipe, an upper back wall extending upward from the base portion, with the upper back wall having a door opening, and a filter door removably mounted in the door opening, with the filter door including vent openings allowing fluid flow therethrough;
   a vent shield extending proximate to the vent openings on a back side of the upper back wall, the vent shield having a back wall with a top edge connected to the filter door and extending outward away from the upper back wall as the back wall extends downward, the vent shield also having side walls extending from the back wall to the filter door to define a bottom opening; and
   a diverter having side walls mounted to the upper back wall and a back wall extending between the side walls, the diverter extending around the vent shield to form a gap between the diverter walls and the vent shield to receive a filter therein.

10. The fuel venting system of claim 9 wherein the back and side walls of the diverter define a lower opening of the diverter.

11. The fuel venting system of claim 10 wherein one of the side walls of the diverter extends downward farther than another wall of the diverter such that the lower opening is oriented facing forward on the vehicle.

12. The fuel venting system of claim 9 wherein the back and side walls of the diverter define an upper opening and the fuel venting system includes a filter housing mounted in the upper opening and the filter is mounted in the filter housing and extends between the diverter and the vent shield.

13. The fuel venting system of claim 12 wherein the filter housing includes a fresh air line connector configured to mount to a fresh air line.

* * * * *